United States Patent
Khera et al.

(10) Patent No.: US 7,031,121 B2
(45) Date of Patent: Apr. 18, 2006

(54) PERPENDICULAR RECORDING MAGNETIC HEAD WITH A WRITE SHIELD MAGNETICALLY COUPLED TO A FIRST POLE PIECE

(75) Inventors: Gautam Khera, Morgan Hill, CA (US); Quang Le, San Jose, CA (US); Son Van Nguyen, Los Gatos, CA (US); Aron Pentek, San Jose, CA (US); Mason Lamar Williams, III, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 148 days.

(21) Appl. No.: 10/631,642

(22) Filed: Jul. 30, 2003

(65) Prior Publication Data

US 2005/0024766 A1    Feb. 3, 2005

(51) Int. Cl.
G11B 5/127 (2006.01)
G11B 5/11 (2006.01)

(52) U.S. Cl. ..................................... 360/317; 360/319
(58) Field of Classification Search ............... 360/317, 360/319, 313, 110, 125, 126, 119
See application file for complete search history.

(56) References Cited

U.S. PATENT DOCUMENTS

| | | | |
|---|---|---|---|
| 4,321,641 A | 3/1982 | Lee | 360/126 |
| 4,935,832 A | 6/1990 | Das et al. | 360/112 |
| 4,967,298 A | 10/1990 | Mowry | 360/317 |
| RE33,949 E | 6/1992 | Mallary et al. | 360/110 |
| 5,557,492 A | 9/1996 | Gill et al. | 360/319 |
| 5,757,591 A | 5/1998 | Carr et al. | 360/323 |
| 5,828,530 A | 10/1998 | Gill et al. | 360/319 |
| 5,850,325 A | 12/1998 | Miyauchi et al. | 360/319 |
| 6,025,977 A | 2/2000 | Hu et al. | 360/319 |
| 6,342,993 B1 | 1/2002 | Sato | 360/319 |
| 6,404,601 B1 | 6/2002 | Rottmayer et al. | 360/317 |
| 6,414,824 B1 | 7/2002 | Sasaki | 360/317 |
| 2002/0048125 A1 | 4/2002 | Macken et al. | 360/319 |
| 2002/0064003 A1 | 5/2002 | Kim et al. | 360/319 |
| 2004/0218312 A1* | 11/2004 | Matono | 360/317 |
| 2005/0068678 A1* | 3/2005 | Hsu et al. | 360/126 |
| 2005/0083605 A1* | 4/2005 | Hu et al. | 360/125 |
| 2005/0128637 A1* | 6/2005 | Johnston et al. | 360/125 |

* cited by examiner

Primary Examiner—Julie Anne Watko
(74) Attorney, Agent, or Firm—Ervin F. Johnston

(57) ABSTRACT

A perpendicular recording write head has ferromagnetic first and second pole pieces which are connected at a back gap and an insulation stack with a write coil layer embedded therein is located between the first and second pole pieces and between a head surface of the write head and the back gap. The second pole piece has a pole tip which is located at the head surface and a recessed ferromagnetic write shield layer. A nonmagnetic isolation layer is located between the second pole piece and the write shield layer and at least one ferromagnetic stud is magnetically connected between the first pole piece layer and the write shield layer and is located between the head surface and the insulation stack.

18 Claims, 14 Drawing Sheets

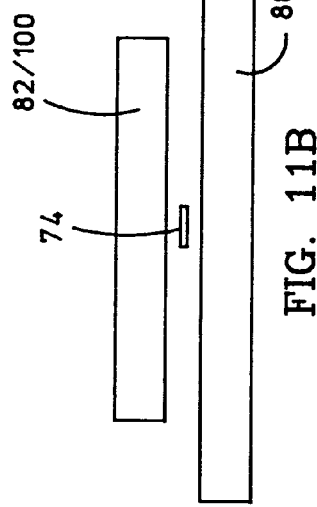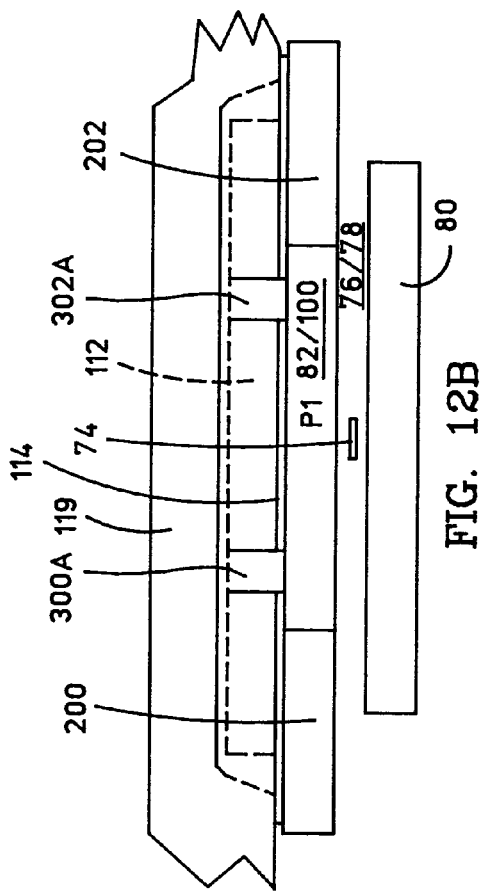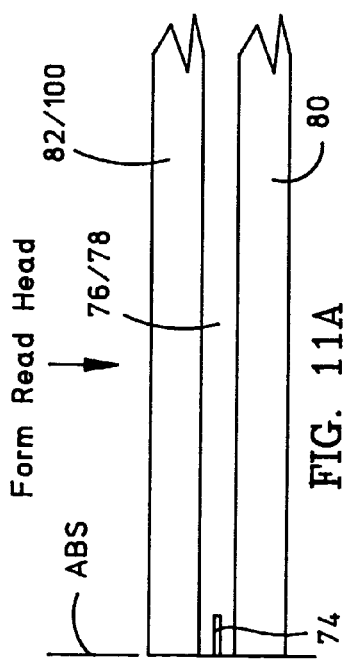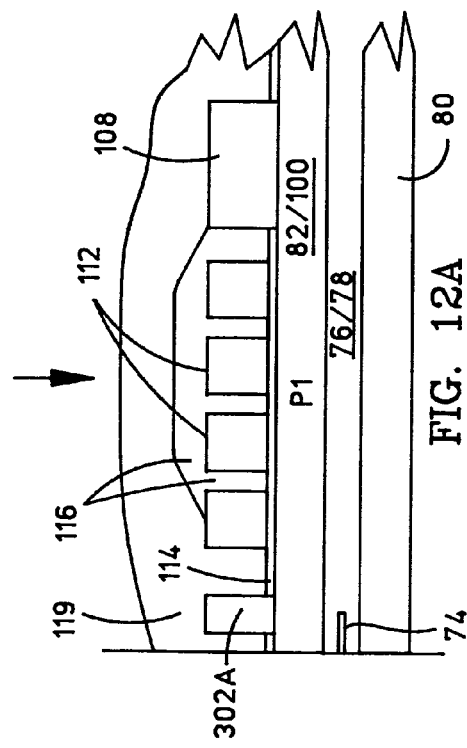

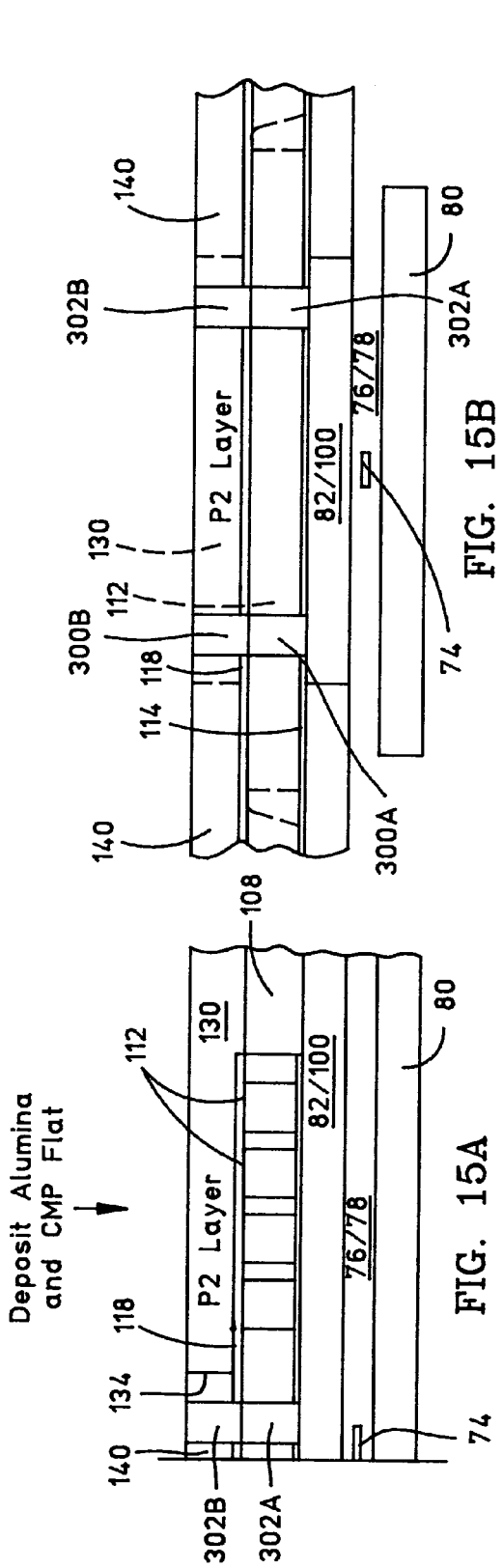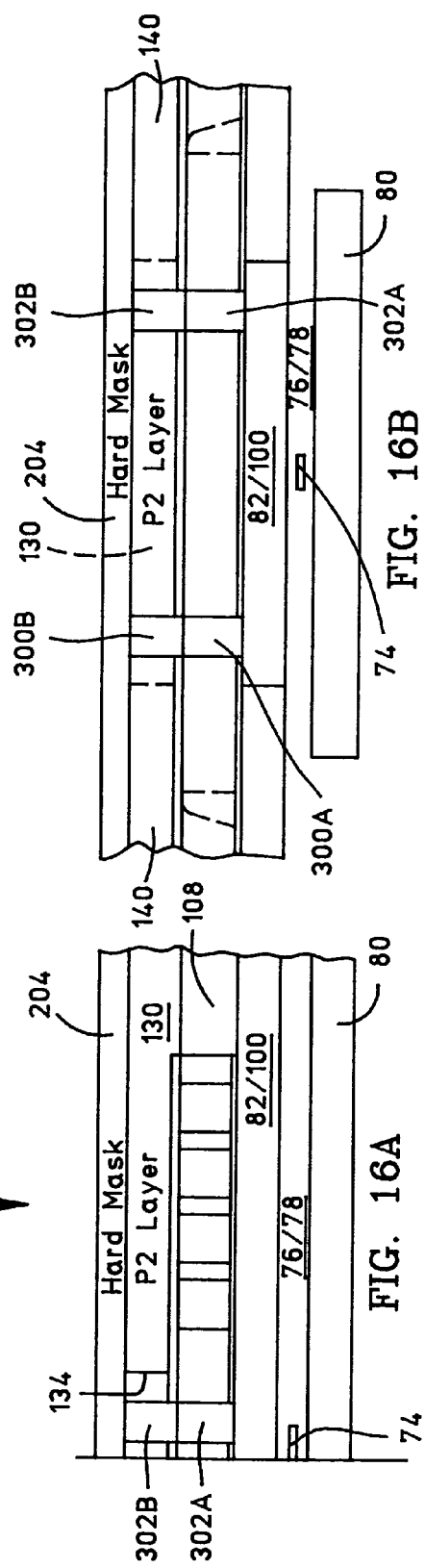

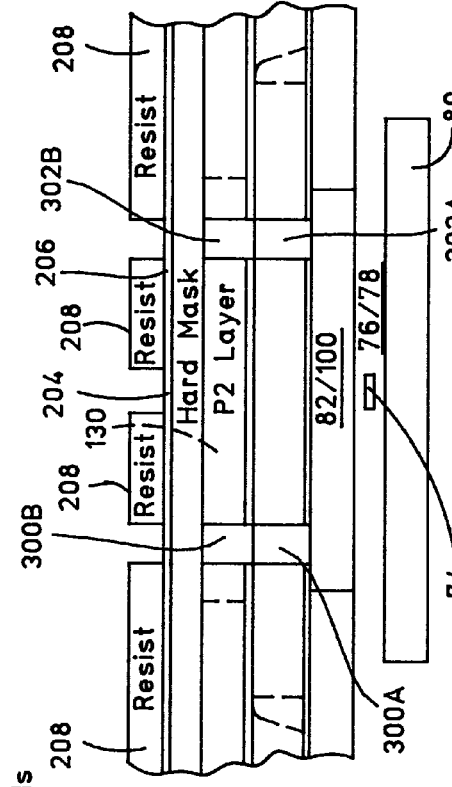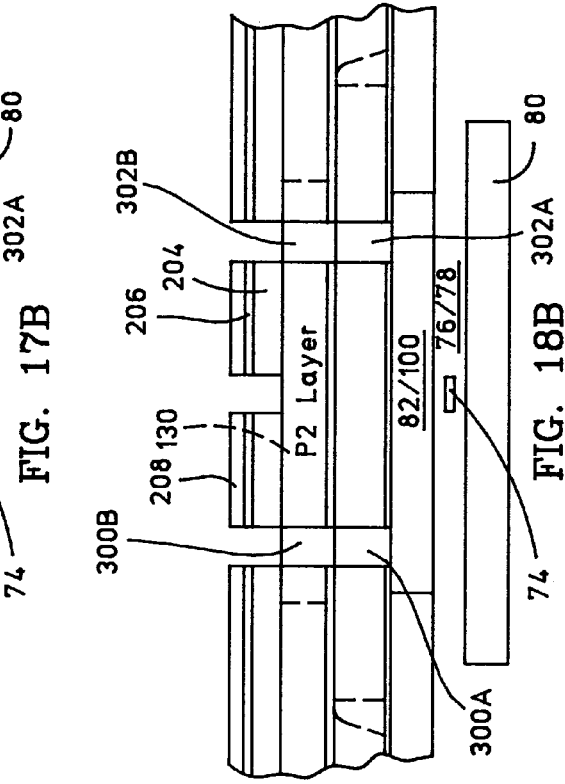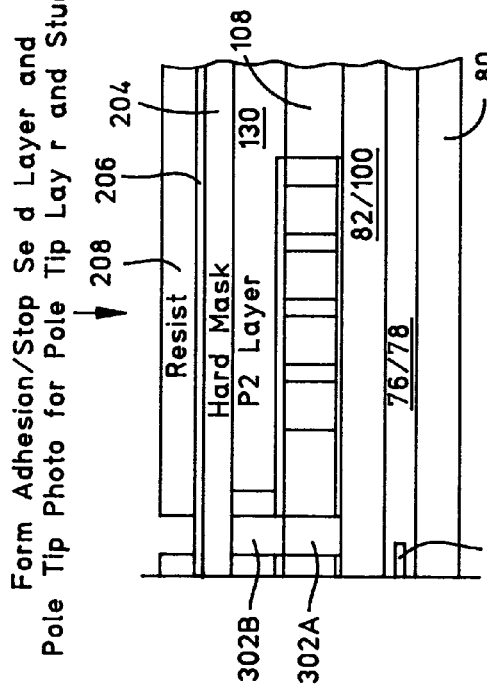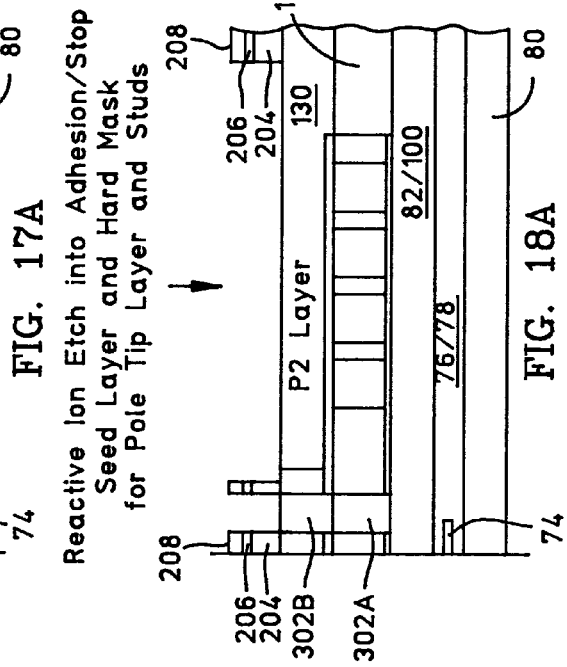

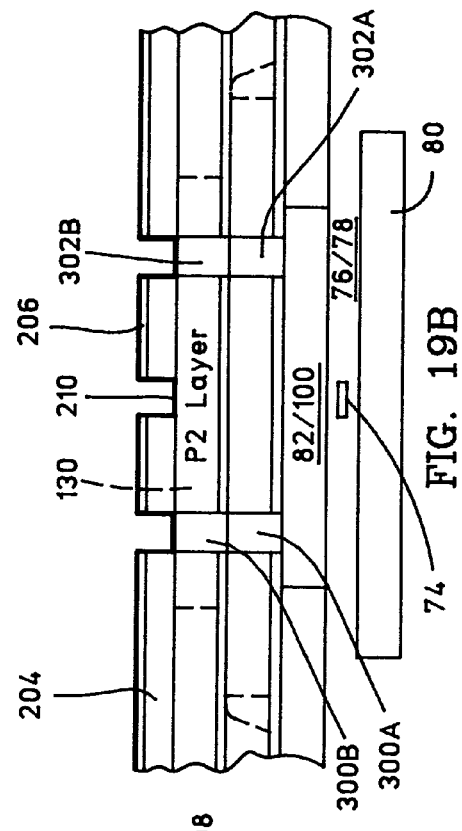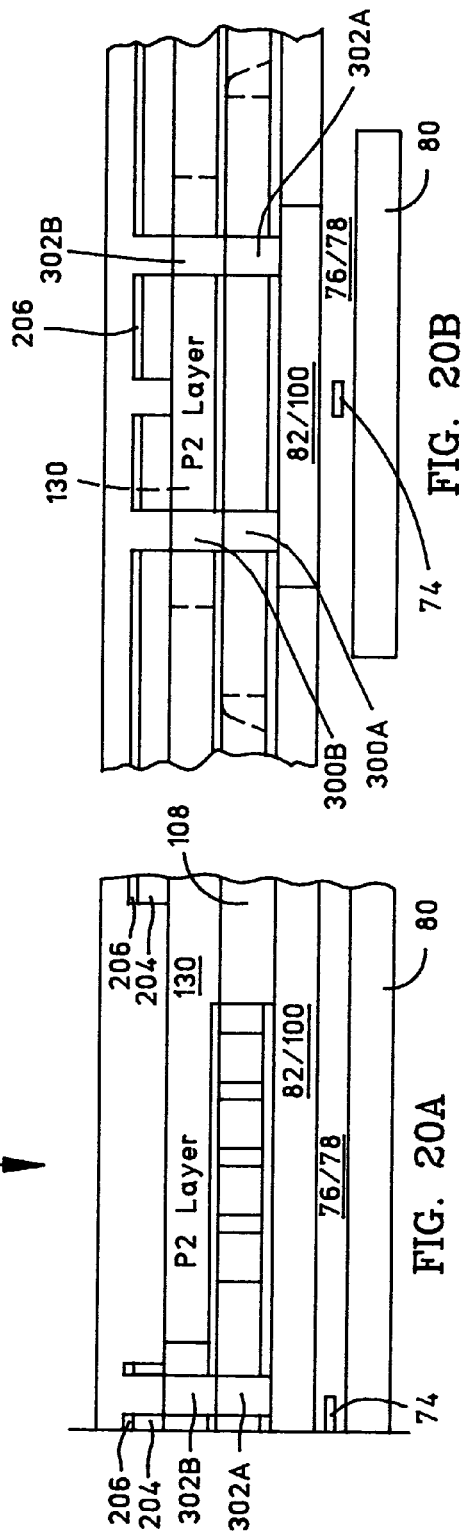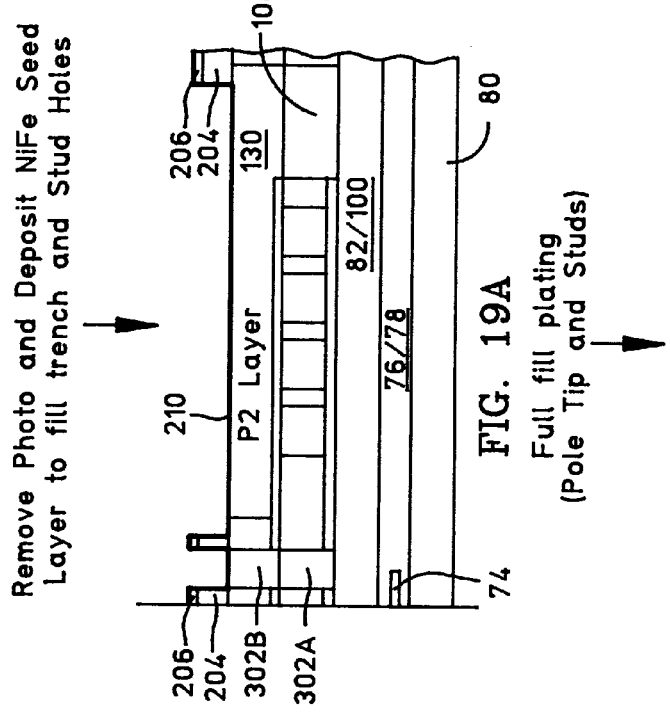

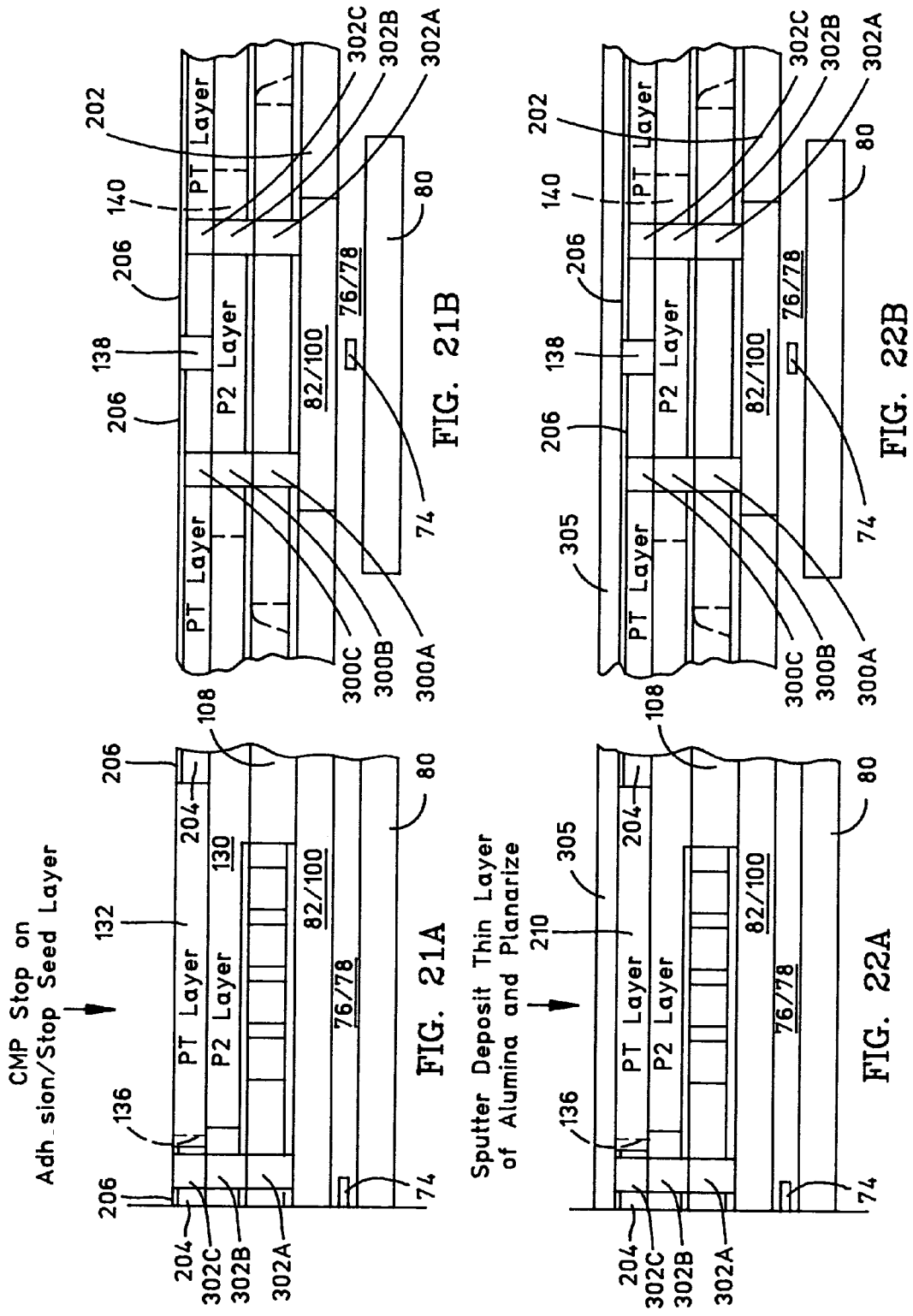

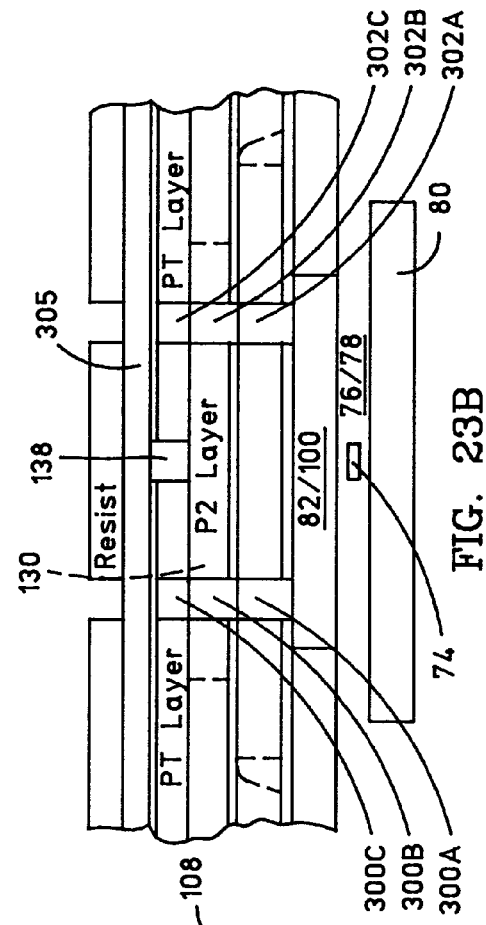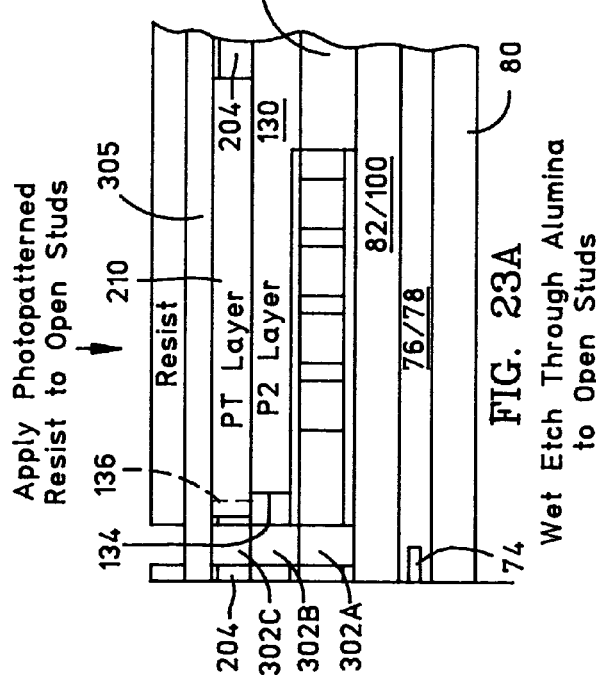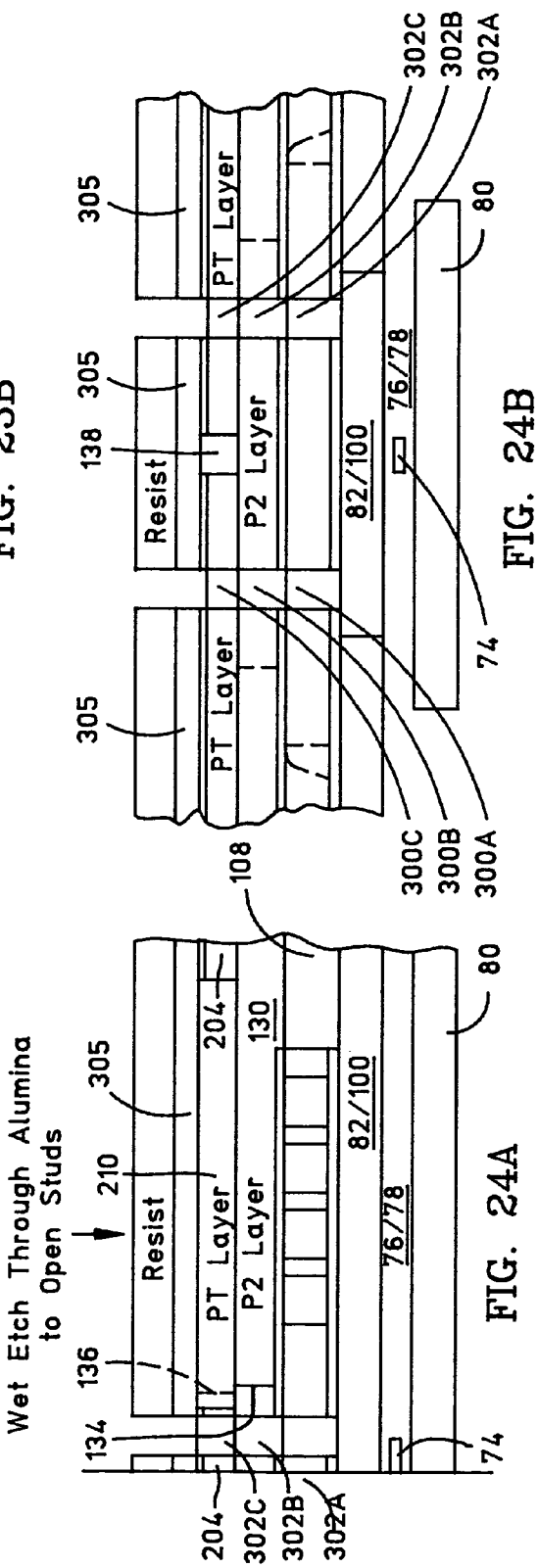

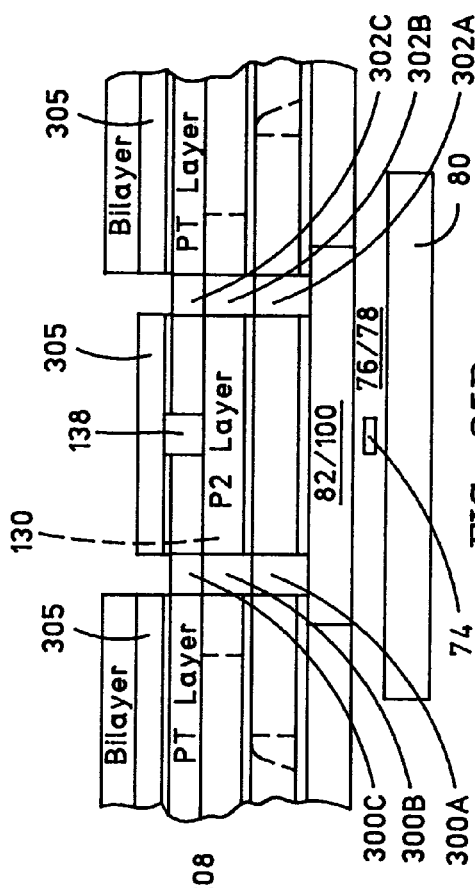
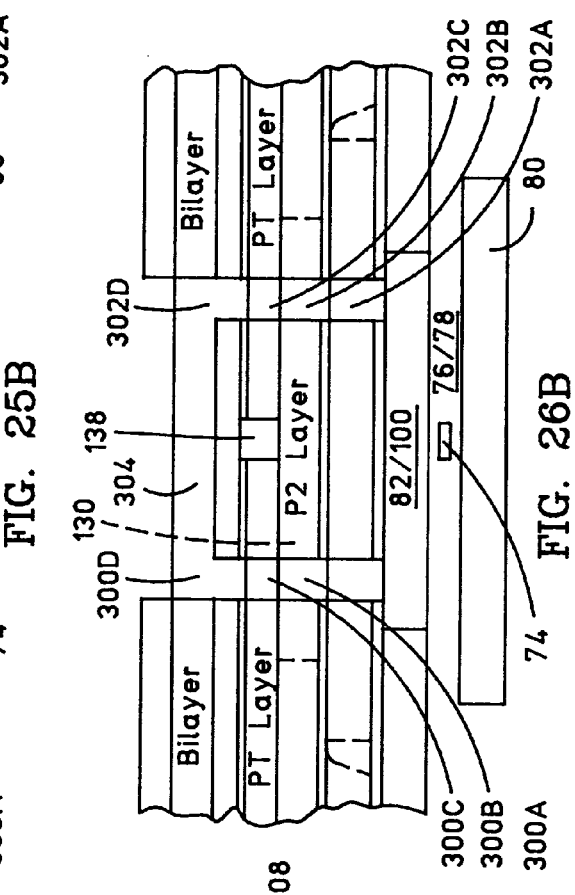
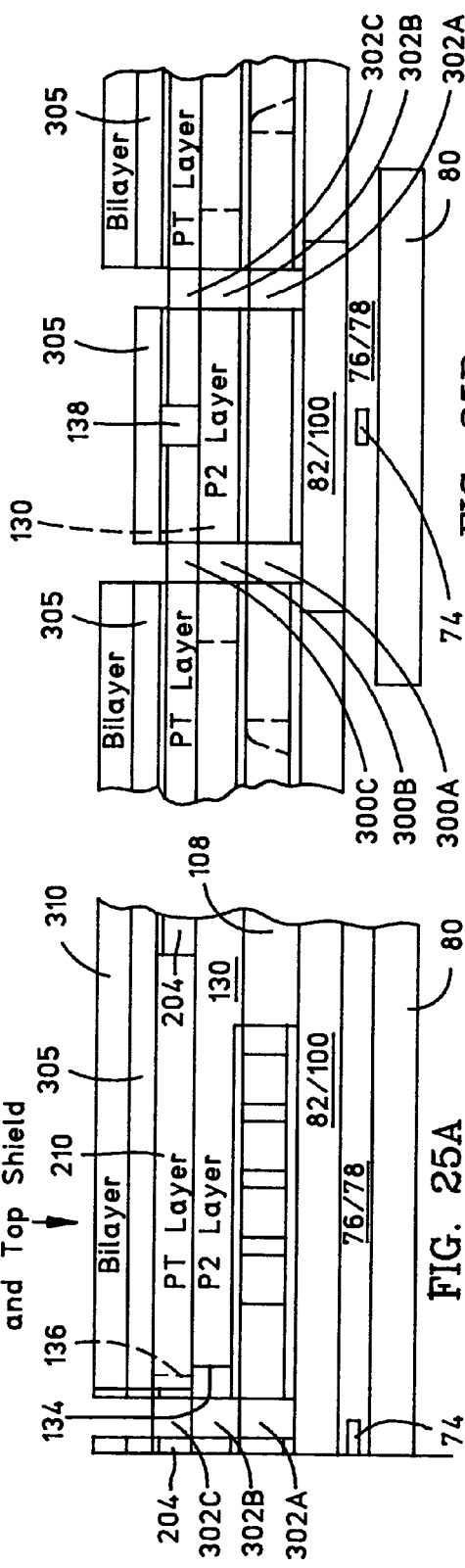
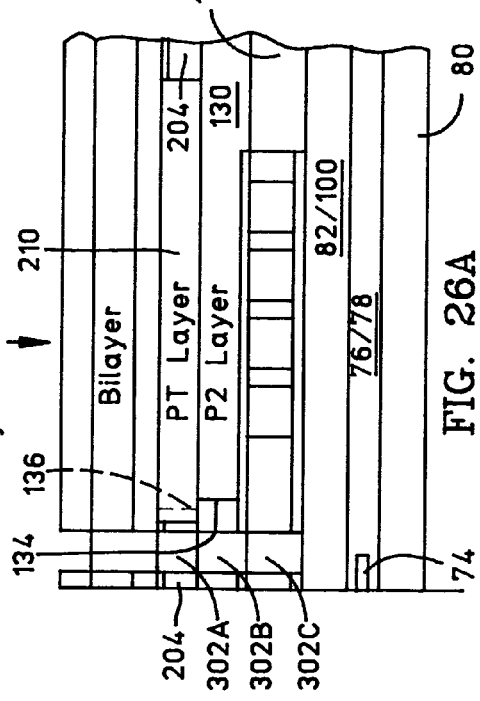

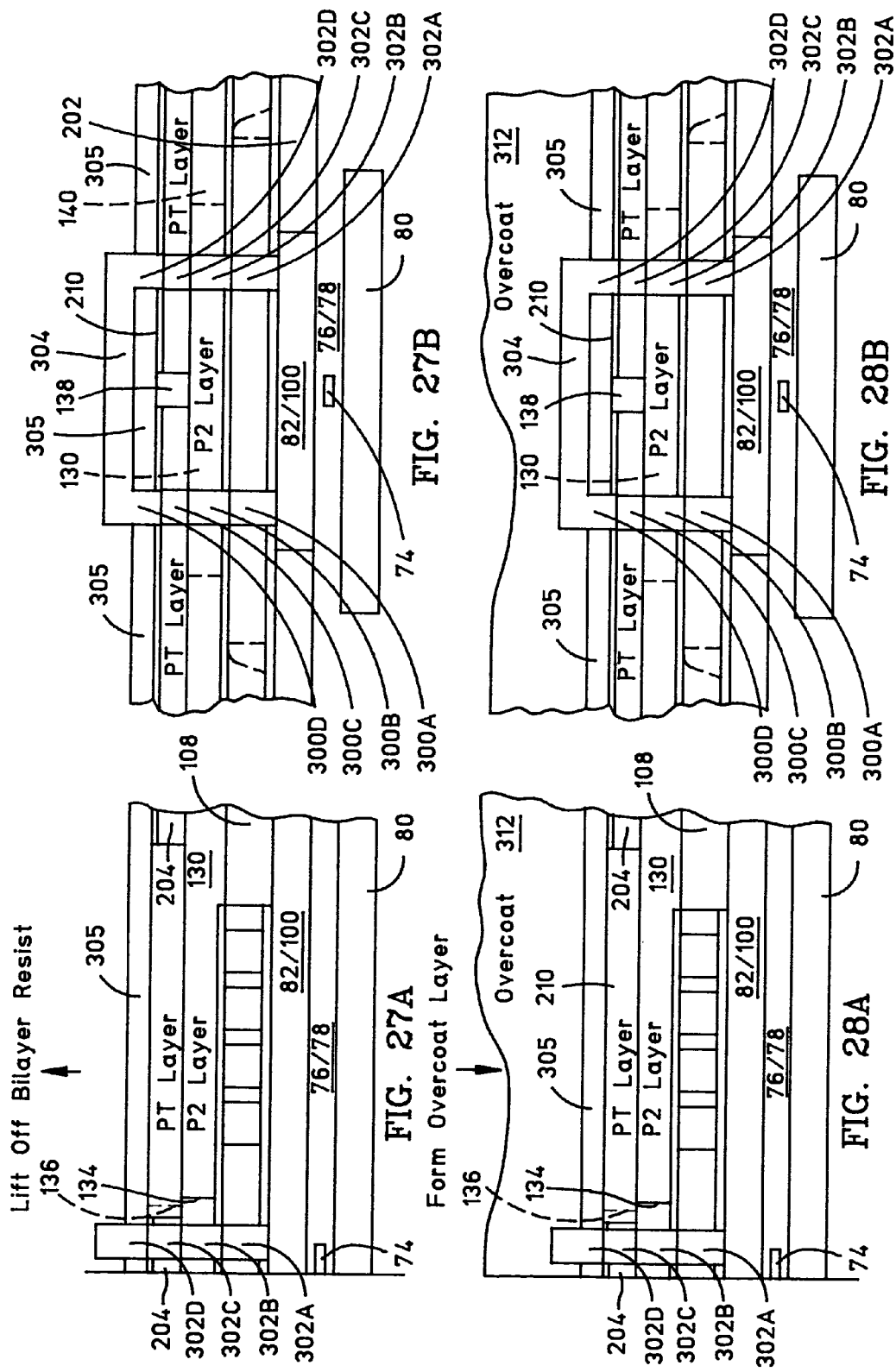

PERPENDICULAR RECORDING MAGNETIC HEAD WITH A WRITE SHIELD MAGNETICALLY COUPLED TO A FIRST POLE PIECE

BACKGROUND OF THE INVENTION

1. Field of the Invention

The present invention relates to a perpendicular recording magnetic head with a write shield magnetically coupled to a first pole piece and, more particularly, to such a head which employs ferromagnetic studs magnetically coupling the write shield to the first pole piece.

2. Description of the Related Art

The heart of a computer is a magnetic disk drive which includes a rotating magnetic disk, a slider that has write and read heads, a suspension arm and an actuator arm. When the disk is not rotating the actuator arm locates the suspension arm so that the slider is parked on a ramp. When the disk rotates and the slider is positioned by the actuator arm above the disk, air is swirled by the rotating disk adjacent an air bearing surface (ABS) of the slider causing the slider to ride on an air bearing a slight distance from the surface of the rotating disk. When the slider rides on the air bearing the actuator arm positions the write and read heads over selected circular tracks on the rotating disk where field signals are written and read by the write and read heads. The write and read heads are connected to processing circuitry that operates according to a computer program to implement the writing and reading functions.

A write head is typically rated by its areal density which is a product of its linear bit density and its track width density. The linear bit density is the number of bits which can be written per linear inch along the track of the rotating magnetic disk and the track width density is the number of tracks that can be written per inch along a radius of the rotating magnetic disk. The linear bit density is quantified as bits per inch (BPI) and the track width density is quantified as tracks per inch (TPI). The linear bit density depends upon the length of the bit along the track and the track width density is dependent upon the width of the second pole tip at the ABS. Efforts over the years to increase the areal density have resulted in computer storage capacities increasing from kilobytes to megabytes to gigabytes.

The magnetic moment of each pole piece of a write head is parallel to the ABS and to the major planes of the layers of the write head. When the write current is applied to the coil of the write head the magnetic moment rotates toward or away from the ABS, depending upon whether the write signal is positive or negative. When the magnetic moment is rotated from the parallel position, magnetic flux fringing between the pole pieces writes a positive or a negative bit in the track of the rotating magnetic disk. As the write current frequency is increased, the linear bit density is also increased. An increase in the linear bit density is desirable in order to increase the aforementioned areal density which increase results in increased storage capacity.

There are two types of magnetic write heads. One type is a longitudinal recording write head and the other type is a perpendicular recording write head. In the longitudinal recording write head the flux induced into first and second pole pieces by a write coil fringes across a write gap layer, between the pole pieces, into the circular track of the rotating magnetic disk. This causes an orientation of the magnetization in the circular disk to be parallel to the plane of the disk which is referred to as longitudinal recording. The volume of the magnetization in the disk is referred to as a bit cell and the magnetizations in various bit cells are antiparallel so as to record information in digital form. The bit cell has a width representing track width, a length representing linear density and a depth which provides the volume necessary to provide sufficient magnetization to be read by a sensor of the read head. In longitudinal recording magnetic disks this depth is somewhat shallow. The length of the bit cell along the circular track of the disk is determined by the thickness of the write gap layer. The write gap layer is made as thin as practical so as to decrease the length of the bit cell along the track which, in turn, increases the linear bit density of the recording. The width of the second pole tip of the longitudinal write head is also made as narrow as possible so as to reduce the track width and thereby increase the track width density. Unfortunately, the reduction in the thickness of the write gap layer and the track width is limited because the bit cell is shallow and there must be sufficient bit cell volume in order to produce sufficient magnetization in the recorded disk to be read by the sensor of the read head.

In a perpendicular recording write head there is no write gap layer. The second pole piece has a pole tip with a width that defines the track width of the write head and a wider yoke portion which delivers the flux to the pole tip. At a recessed end of the pole tip the yoke flares laterally outwardly to its full width and thence to a back gap which is magnetically connected to a back gap of a first pole piece. The perpendicular write head records signals into a perpendicular recording magnetic disk which is significantly thicker than a longitudinal recording magnetic disk. In the perpendicular recording magnetic disk a soft magnetic layer underlies a thicker perpendicular recording layer which has a high saturation magnetization $M_S$ and a high coercivity $H_C$. The thicker disk permits a larger bit cell so that the length and the width of the cell can be decreased and still provide sufficient magnetization to be read by the read head. This means that the width and the thickness or height of the pole tip at the ABS can be reduced to increase the aforementioned TPI and BPI. The magnetization of the bit cell in a perpendicular recording scheme is perpendicular to the plane of the disk as contrasted to parallel to the plane of the disk in the longitudinal recording scheme. The flux from the pole tip into the perpendicular recording magnetic disk is in a direction perpendicular to the plane of the disk, thence parallel to the plane of the disk in the aforementioned soft magnetic underlayer and thence again perpendicular to the plane of the disk into the first pole piece to complete the magnetic circuit.

Experimental evidence and modeling have shown that a trailing edge write shield improves the derivative of the head field dHy/dx and increases the longitudinal field at the writing location. These features improve transition sharpness (linear resolution) and permit higher coercive field media (improved stability). Initial discussion of a perpendicular pole head with trailing edge shields (and leading edge shields) and its advantages was published by A. S. Hoagland of IBM in "High resolution magnetic recording structures", *IBM Journal of Research and Development*, 1958 (2) pp. 90–104. That head was fabricated from laminated HiMu80 sheets and hand wound coils. This would be difficult to manufacture at the dimensions needed for today's recording densities. In addition, M. Mallary obtained U.S. Pat. No. 4,656,546, "Vertical magnetic recording arrangement", reissued as USRE 033949 for a pole head in which a single writing pole is followed by a pancake coil and a large cross-section element which serves as both a trailing shield and return pole for flux closure. This design was appropriate before magnetoresistive read heads were in common use. If a shielded magnetoresistive read head is built below the write pole in this design, undesirable writing will take place under the shields of the read head which will assume approximately the same magnetomotive potential as the writing pole. Moreover, M. Mallary, A. Torobi and M. Benakli of Maxtor described in paper WA-02 at the North American Perpendicular Magnetic Recording Conference, Jan. 9, 2002, a perpendicular pole with a trailing shield and also side shields. This head is workable with a leading magnetoresistive head structure because two pancake coils are used to ensure that the read head is at the same magnetomotive potential as the trailing shield pole and the soft underlayer of the medium. A disadvantage of this design is that it requires two pancake coils. It also requires a relatively thick return pole which will have to be made of high moment material for the desirable high write field capability, and a very narrow throat height for that element. This design will also result in write disturb of the read shields.

SUMMARY OF THE INVENTION

An aspect of the present invention is an improved shielded pole head which requires only a single pancake coil and yet allows the trailing shield, P1 of the write head and the read element shields to all be at the same potential. Another aspect of the invention is that the third dimension is used to allow low reluctance coupling of a trailing shield to the large cross-section return pole P1 of a perpendicular write head. That coupling is via "studs" which are fabricated as described below of high moment highly permeable material between P1 and a (short) trailing shield and the studs being positioned outside of the single pancake coil.

The present perpendicular recording write head includes ferromagnetic first and second pole pieces which are connected to a back gap which is recessed from a head surface of the write head, an insulation stack with a write coil layer embedded therein located between the first and second pole pieces and located between the head surface and the back gap, the second pole piece having a pole tip which is located at the head surface, a ferromagnetic write shield layer which is separated from the second pole piece by a nonmagnetic isolation layer, at least one ferromagnetic stud magnetically connecting the first pole piece layer and the write shield layer with the stud being located between the head surface and the insulation stack. The perpendicular recording write head is typically combined with a read head in a magnetic head assembly. With respect to the movement of the medium (disk or tape) past the magnetic head assembly, the write shield layer is a trailing shield and the read head is a leading read head. The present invention provides improved transition sharpness by the write pole tip and minimizes disturbance of the read shields.

Other aspects of the invention will be appreciated upon reading the following description taken together with the accompanying drawings wherein the various figures are not to scale with respect to one another nor are they to scale with respect to the structure depicted therein.

BRIEF DESCRIPTION OF THE DRAWINGS

FIGS. 11A and 1B are a longitudinal view and an ABS view of the steps involved in fabricating the read head portion 72 of FIG. 6;

FIGS. 12A and 12B are the same as FIGS. 11A and 11B except the first pole piece has been planarized, studs are formed, the coils are fabricated, insulation is provided for the coils, a back gap has been constructed and an alumina layer has been deposited, the cut in FIG. 12A and subsequent "A" figures laterally offset and the cut in FIG. 12B and subsequent "B" figures recessed from the ABS to show stud segments in full;

FIGS. 15A and 15B are the same as FIGS. 14A and 14B except an alumina layer has been deposited and CMP has been implemented to provide a flat surface;

FIGS. 16A and 16B are the same as FIGS. 15A and 15B except a hard mask has been formed;

FIGS. 17A and 17B are the same as FIGS. 16A and 16B except an adhesion/stop seed layer has been formed and a photoresist layer, which is being patterned, is formed on the Ta layer;

FIGS. 18A and 18B are the same as FIGS. 17A and 17B except reactive ion etching has been implemented into the hard mask and the adhesion/stop seed layer producing openings for studs and a second pole piece pole tip;

FIGS. 19A and 19B are the same as FIGS. 18A and 18B except a NiFe seed layer has been formed in the openings;

FIGS. 20A and 20B are the same as FIGS. 19A and 19B except the openings have been filled with ferromagnetic material;

FIGS. 21A and 21B are the same as FIGS. 20A and 20B except the magnetic head has been CMP until the CMP reaches the adhesion/stop seed layer;

FIGS. 22A and 22B are the same as FIGS. 21A and 21B except a thin layer of alumina has been sputter deposited and the head assembly has been planarized;

FIGS. 23A and 23B are the same as FIGS. 22A and 22B except photopatterned resist has been applied with openings;

FIGS. 24A and 24B are the same as FIGS. 23A and 23B except etching has been implemented to provide openings in the alumina to the studs;

FIGS. 25A and 25B are the same as FIGS. 24A and 24B except the resist has been removed and a bilayer resist has been patterned to form the studs and a top shield;

FIGS. 26A and 26B are the same as FIGS. 25A and 25B except the top shield and the studs have been sputter deposited;

FIGS. 27A and 27B are the same as FIGS. 26A and 26B except the bilayer resist has been lifted off the assembly; and FIGS. 28A and 28B are the same as FIGS. 27A and 27B except an overcoat layer has been formed on the assembly.

DESCRIPTION OF THE PREFERRED EMBODIMENTS

Magnetic Disk Drive

Figure 1:
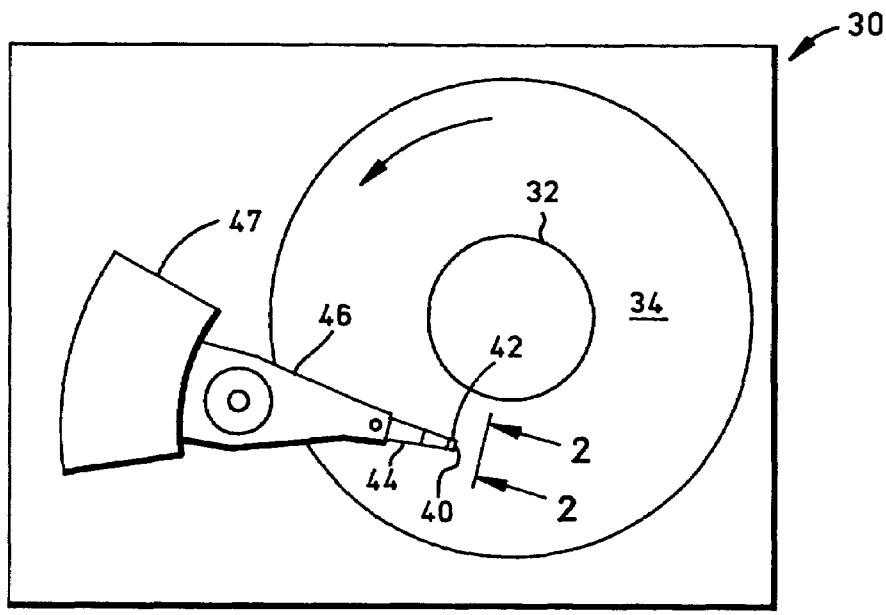
FIG. 1 is a plan view of an exemplary prior art magnetic disk drive.
Figure 2:
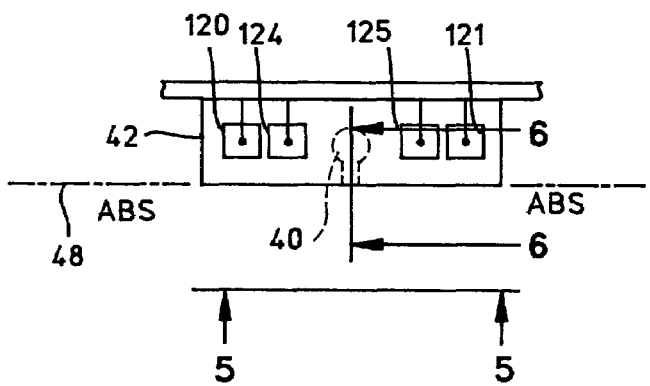
FIG. 2 is an end view of a prior art slider with a magnetic head of the disk drive as seen in plane 2—2 of FIG. 1.
Figure 3:
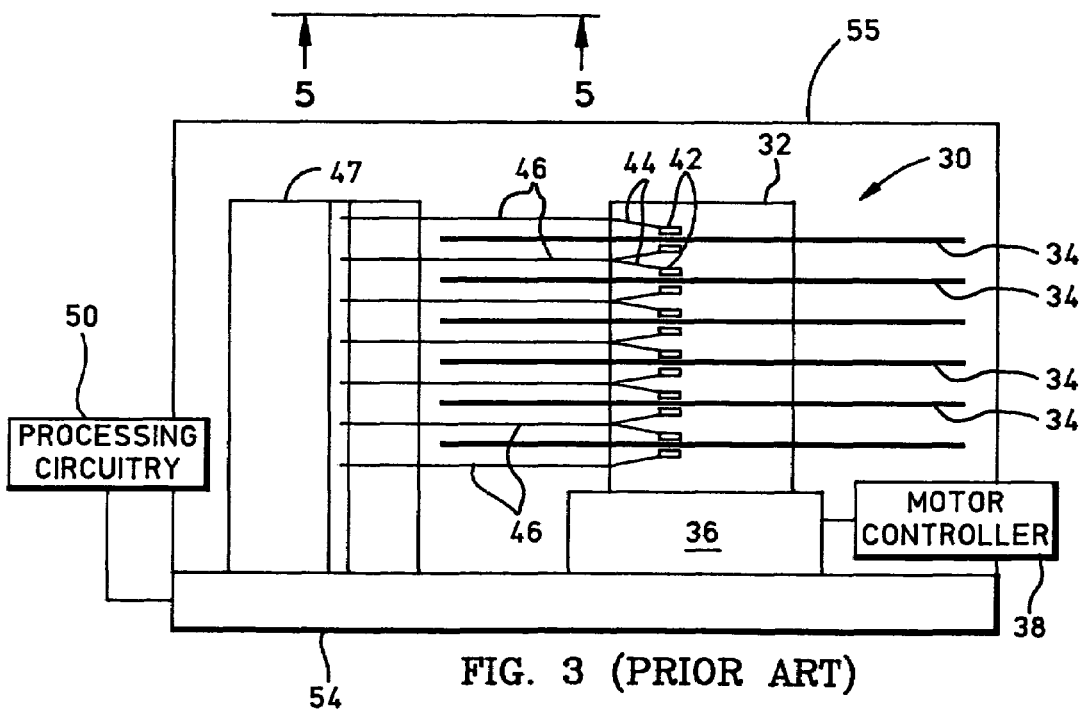
FIG. 3 is an elevation view of the prior art magnetic disk drive wherein multiple disks and magnetic heads are employed.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34.

Figure 4:
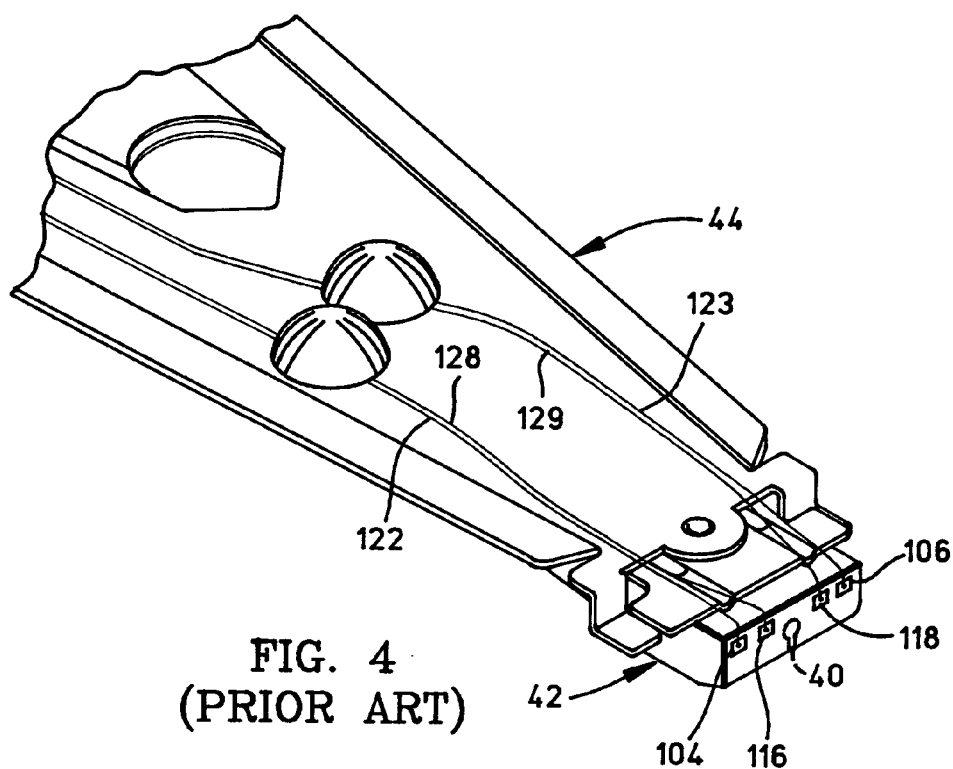
FIG. 4 is an isometric illustration of an exemplary prior art suspension system for supporting the slider and magnetic head.

When the disk 34 is rotated by the spindle motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
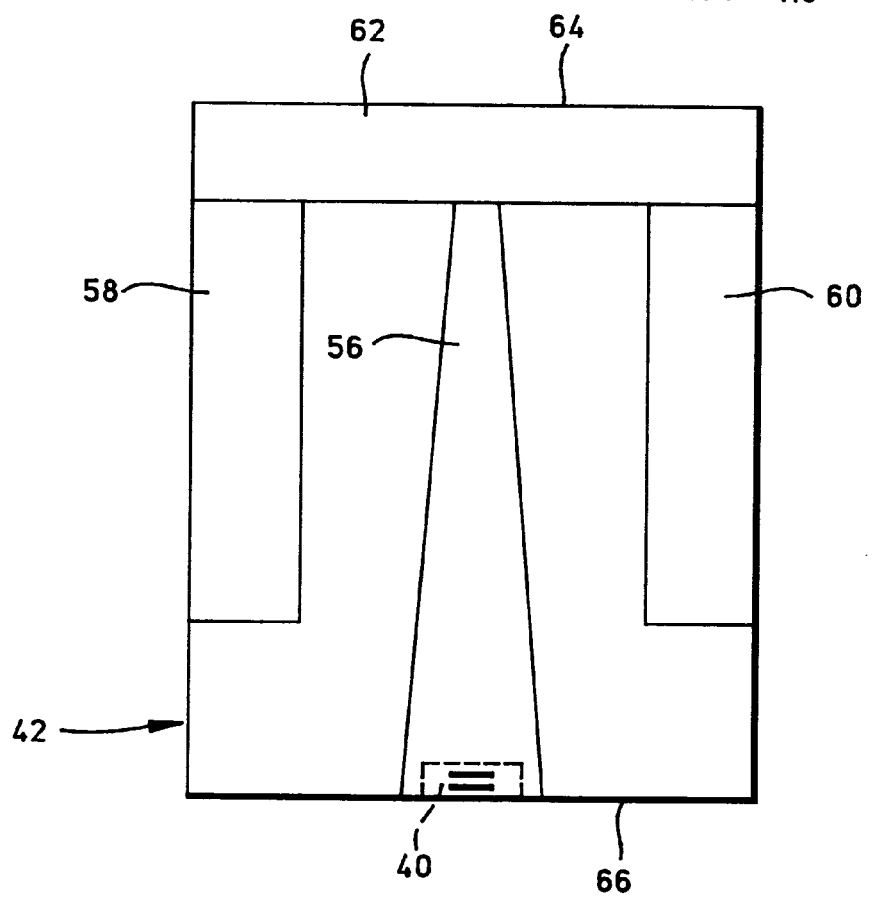
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
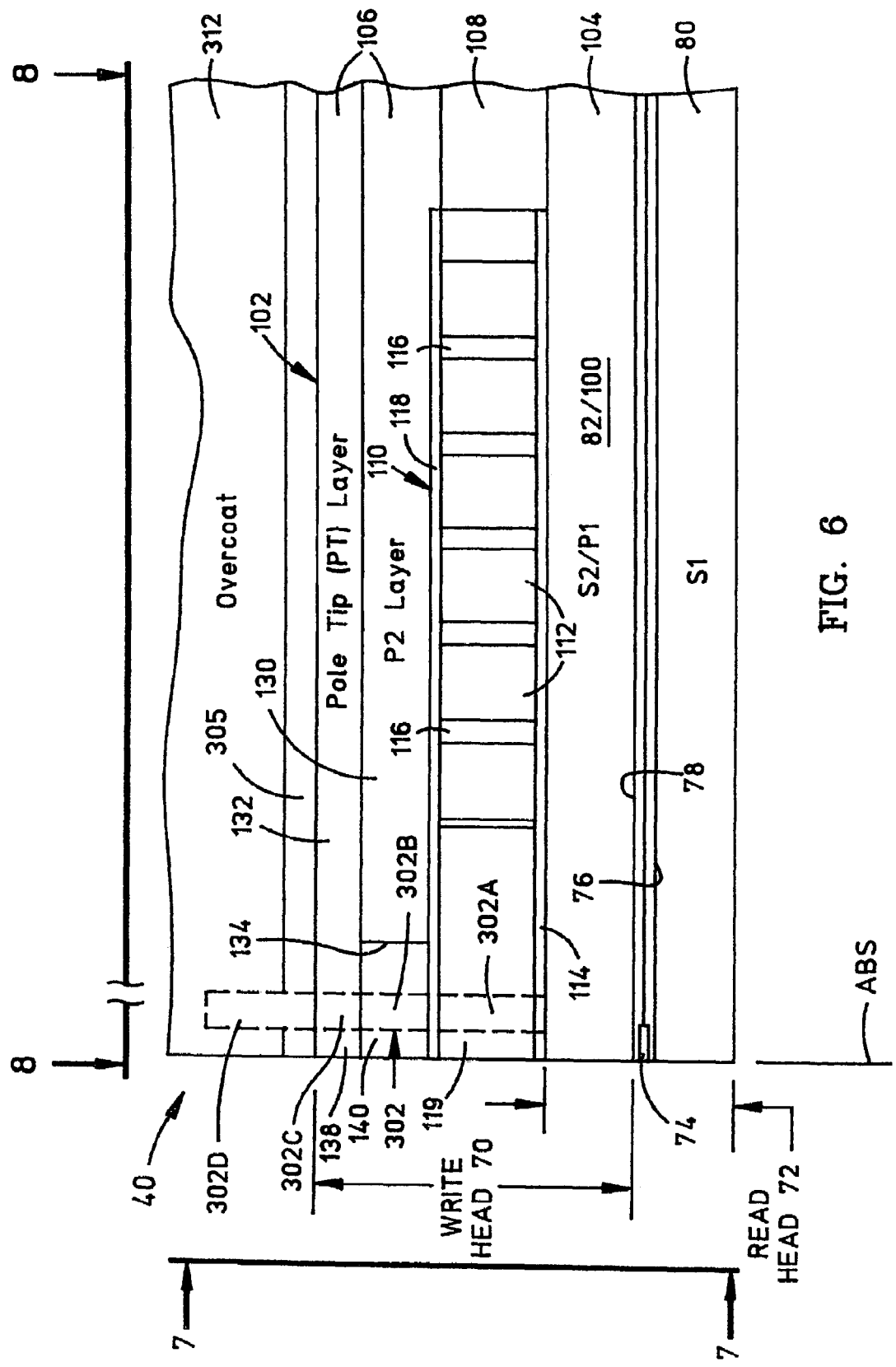
FIG. 6 is a longitudinal cross-sectional view of the slider taken along plane 6—6 of FIG. 2 showing the present perpendicular recording head in combination with a read head.
Figure 7:
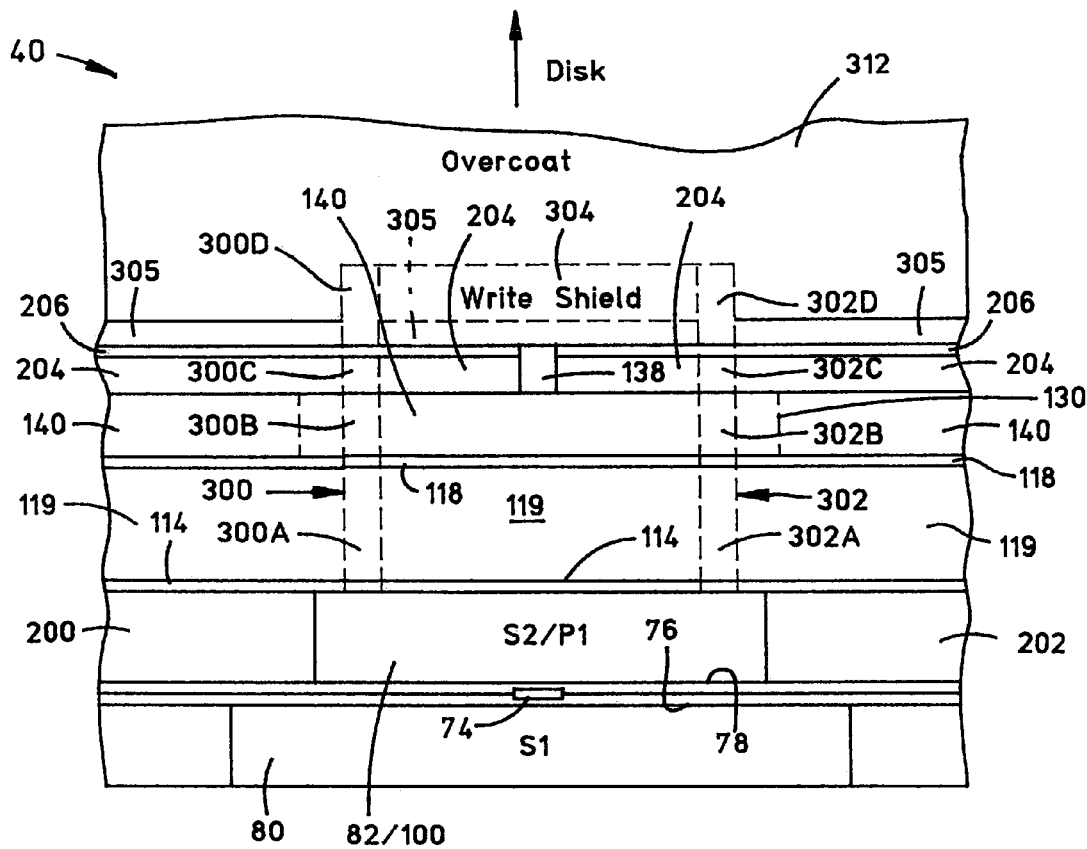
FIG. 7 is an ABS view of the slider taken along plane 7—7 of FIG. 6.

FIG. 6 is a side cross-sectional elevation view of a merged magnetic head assembly 40, which includes a write head portion 70 and a read head portion 72, the read head portion employing a read sensor 74. FIG. 7 is an ABS view of FIG. 6. The sensor 74 is sandwiched between nonmagnetic electrically nonconductive first and second read gap layers 76 and 78, and the read gap layers are sandwiched between ferromagnetic first and second shield layers 80 and 82. In response to external magnetic fields, the resistance of the sensor 74 changes. A sense current Is (not shown) conducted through the sensor causes these resistance changes to be manifested as potential changes. These potential changes are then processed as readback signals by the processing circuitry 50 shown in FIG. 3.

As shown in FIGS. 6 and 7, the write head portion 70 includes first and second pole pieces 100 and 102 which extend from the ABS to back gap portions 104 and 106 which are recessed in the head and which are magnetically connected to a back gap layer 108. The second pole piece 102 may include a bottom recessed second pole piece layer (P2 layer) 130 and a top pole tip layer (PT layer) 132. Located between the first and second pole pieces 100 and 102 is an insulation stack 110 which extends from the ABS to the back gap layer 108 and has embedded therein at least one write coil layer 112. The insulation stack 110 may have a bottom insulation layer 114 which insulates the write coil from the first pole piece 100 and insulation layers 116 and 118 which insulate the write coil layer from the second pole piece 102, respectively. An alumina layer 119 is located between the coil layer and the ABS.

Figure 8:
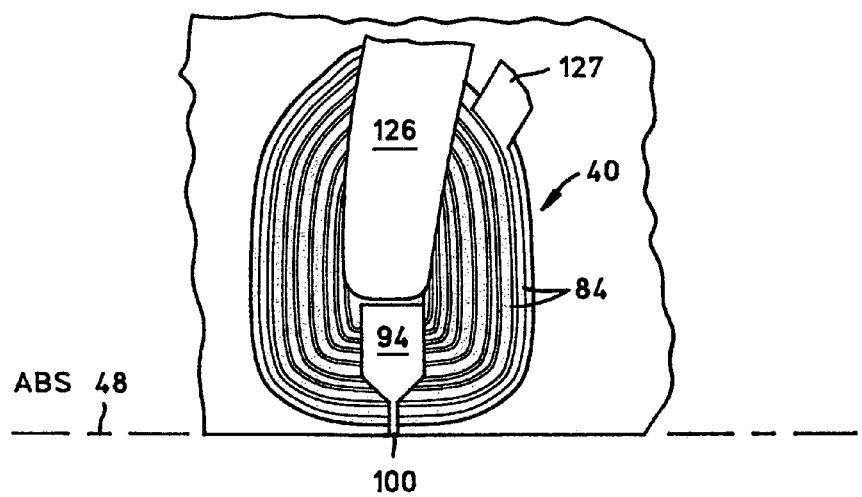
FIG. 8 is a view taken along plane 8—8 of FIG. 6 with all material above the coil layer and leads removed.

Since the second shield layer 82 and the first pole piece layer 100 are a common layer the head is known as a merged head. In a piggyback head the second shield layer and the first pole piece layer are separate layers which are separated by a nonmagnetic layer. As shown in FIGS. 2 and 4, first and second solder connections 120 and 121 connect leads (not shown) from the spin valve sensor 74 to leads 122 and 123 on the suspension 44, and third and fourth solder connections 124 and 125 connect leads 126 and 127 from the coil 84 (see FIG. 8) to leads 128 and 129 on the suspension.

Figure 9:
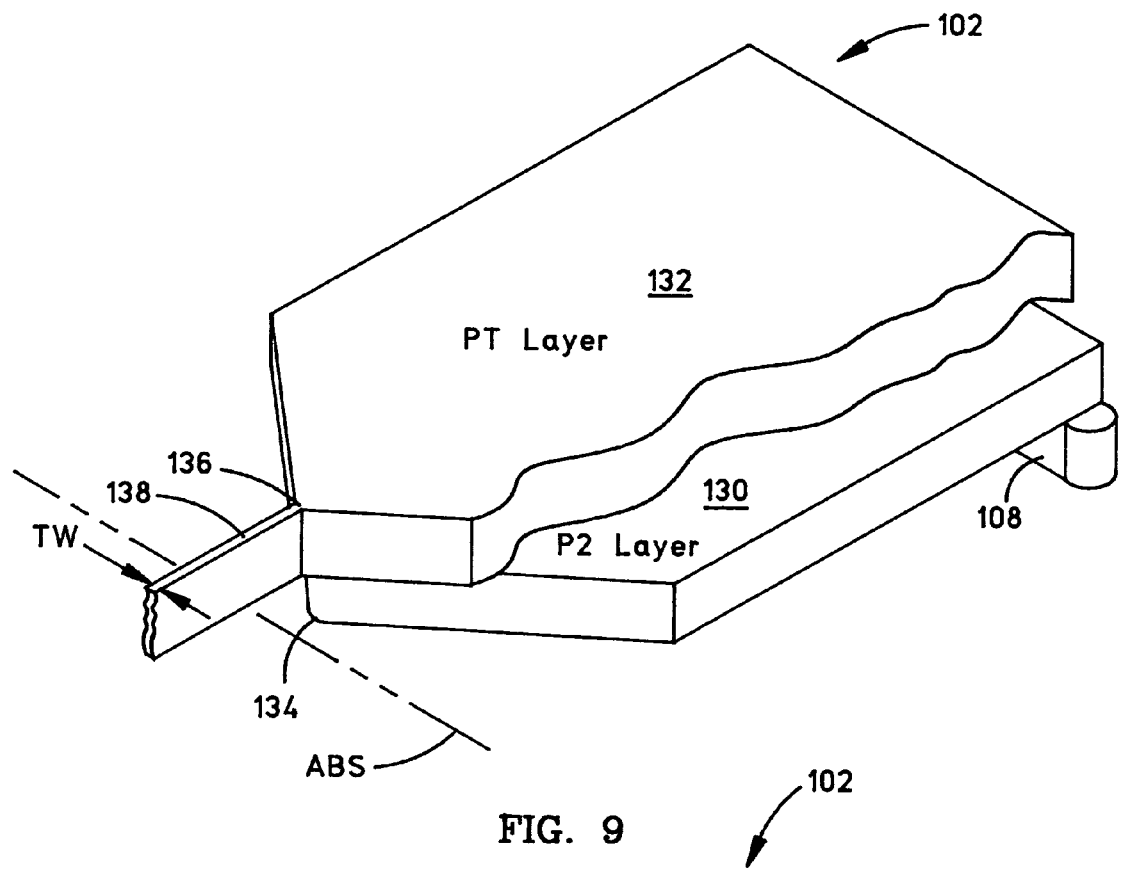
FIG. 9 is an isometric view of a second pole piece of FIG. 6 which includes a bottom pole piece and a top pole tip layer.
Figure 10:
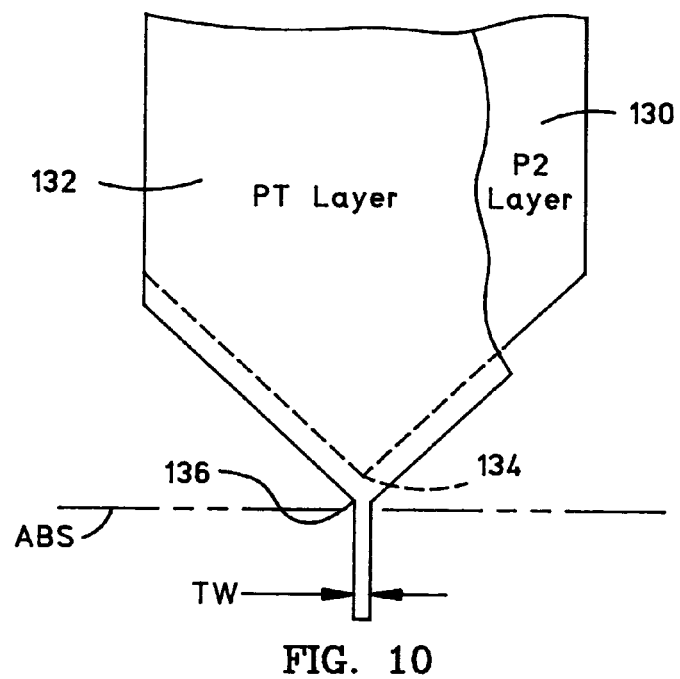
FIG. 10 is a top view of FIG. 9.

As shown in FIGS. 9 and 10, the second pole piece 102 includes the bottom second pole piece (P2) layer 130 and the top ferromagnetic pole tip (PT) layer 132. The layers 130 and 132 have flare points 134 and 136 where the layers first commence to extend laterally outwardly after the ABS. The pole tip layer 132 has a pole tip 138 and a yoke which is located between the pole tip 138 and the back gap 108 (see FIG. 6). The width of the pole tip 138 is the track width (TW) of the recording head. The pole tip 138 is shown extended forward of the ABS in FIGS. 9 and 10 since this is its configuration when it is partially constructed on a wafer where rows and columns of magnetic head assemblies are fabricated. After completion of the magnetic head assemblies, which will be discussed hereinafter, the head assemblies are diced into rows of magnetic head assemblies and lapped to the ABS shown in FIG. 6. Each row of magnetic head assemblies is then diced into individual head assemblies and mounted on the suspensions, as shown in FIG. 3.

As shown in FIGS. 6 and 7, an insulation layer 140 is located between the flare point 134 and the ABS. The insulation layer 140 is not a write gap layer as employed in a longitudinal recording head. In contrast, flux signals magnetize the bit cells in the recording disk in a perpendicular direction with the flux from the pole tip 138 returning to the first pole piece 100 via a soft magnetic layer in a perpendicular recording disk.

It should be noted that when the second pole piece layer 130 (P2 layer) is employed, as shown in FIG. 9, the length of the head assembly 40 between the ABS and the back gap 108 can be shortened so that the write coil frequency can be increased for further increasing the linear bit density of the write head. It should also be understood that the magnetic head assembly may include multiple write coil layers which are stacked one above the other instead of a single write coil layer, as shown in FIG. 6, and still be within the spirit of the invention.

As shown in FIGS. 6 and 7, ferromagnetic studs 300 and 302 are magnetically connected between the first pole piece layer 100 and a ferromagnetic write shield 304. As can be seen from FIG. 6, the studs are located between the coils 112 and the ABS. As shown in FIG. 7, the direction of travel of the magnetic medium, which may be a disk, is from the bottom to the top of the paper. Accordingly, the write shield 304 is a trailing shield and the read head, including the sensor 74, is a leading read head. Each of the studs 300 and 302 may be constructed in four separate processing steps which results in the stud 300 having stud segments 300A, 300B, 300C and 300D and the stud 302 having stud segments 302A, 302B, 302C and 302D wherein the A segments may be simultaneously constructed with the back gap 108, shown in FIG. 6, the B segments may be simultaneously constructed with the second pole piece layer 130, the C segments may be simultaneously constructed with the pole tip layer 132 and the D segments may be simultaneously constructed with the write shield 304. These fabrication steps will be described in detail hereinbelow. An insulation layer 305, which may be alumina, is located between the write shield 304 and the pole tip (PT) layer 132.

Method of Making

FIGS. 11A and 11B to FIGS. 28A and 28B illustrate various steps in the fabrication of the magnetic head assembly 40 shown in FIGS. 6 and 7. In FIGS. 11A and 11B the first and second shield layers 80 and 82 may be fabricated by well-known frame plating techniques and the first and second read gap layers 76 and 78 and the sensor 74 may be fabricated by well-known vacuum deposition techniques.

Figure 13A:
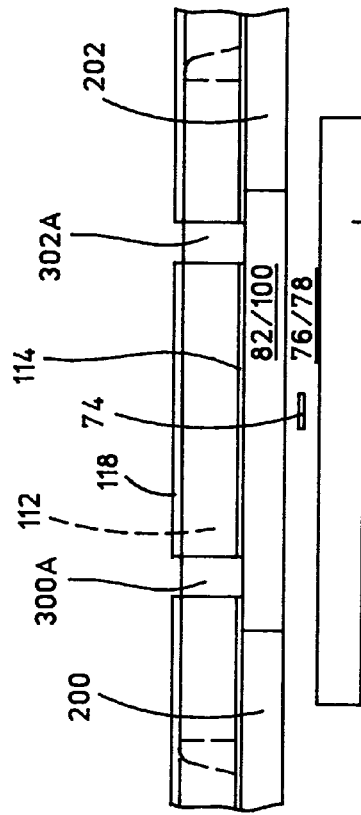
FIGS. 13A and 13B are the same as FIGS. 12A and 12B except the top of the partially completed head has been chemically mechanically polished (CMP) to provide a flat surface where an alumina isolation layer is formed.
Figure 13B:
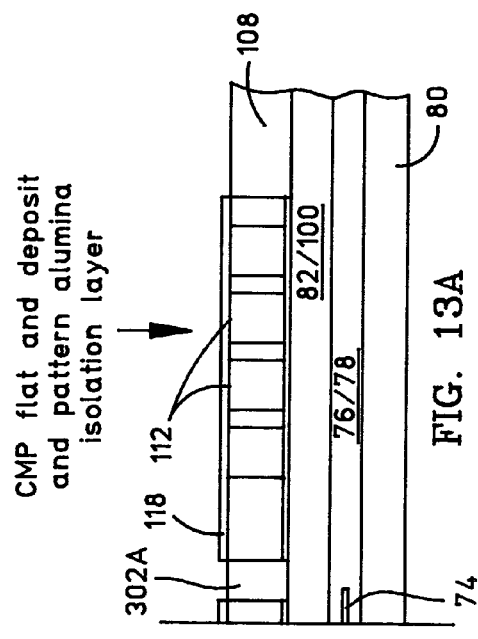

In FIGS. 12A and 12B a thick alumina layer is deposited (not shown) and the thick alumina is chemically mechanically polished (CMP) to the first pole piece layer (P1) 100 leaving alumina layers 200 and 202 on each side of the first pole piece layer (P1) as shown in FIG. 12B. Next, the insulation layer 114, such as alumina, is deposited for insulating a subsequent write coil layer 112 from the first pole piece layer 100. The write coil layer 112 is then formed and is insulated by insulation 116 which may be baked photoresist. After photopatterning (not shown) and etch down to the first pole piece layer 100, the stud segments 300A and 302A and the back gap 108 are simultaneously formed. This is followed by depositing a thick layer of alumina 119. In FIGS. 13A and 13B the magnetic head is chemically mechanically polished (CMP) flat and an isolation layer 118, which may be alumina, is deposited and patterned so as to leave tops of the back gap 108 and the stud segments 300A and 302A exposed.

Figure 14A:
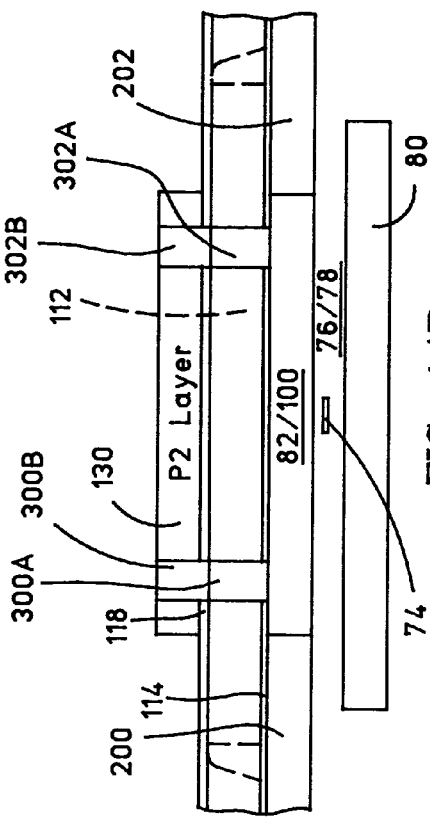
FIGS. 14A and 14B are the same as FIGS. 13A and 13B except studs and a second pole piece layer has been formed.
Figure 14B:
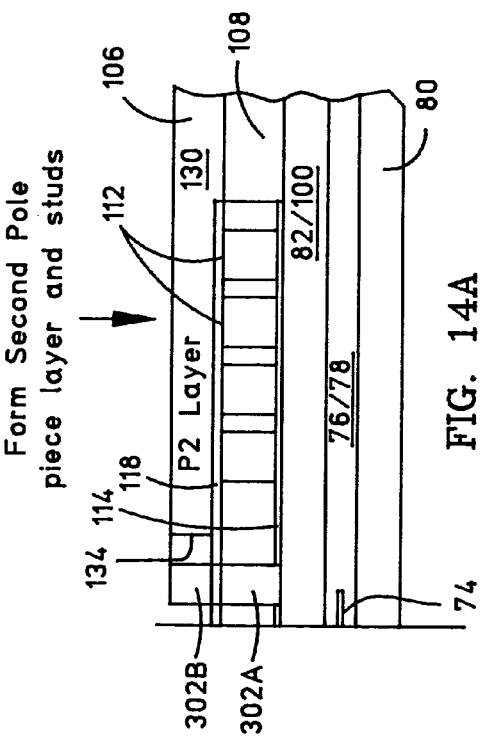

In FIGS. 14A and 14B there is simultaneously formed the second pole piece (P2) layer 130 with a front end 134 which is recessed from the ABS, the back gap portion 106 which is magnetically connected to the back gap 108 and stud segments 300B and 302B. In FIGS. 15A and 15B a thick alumina layer is deposited (not shown) and CMP flat leaving tops of the stud segments 300B and 302B exposed and leaving the alumina layer 140 between the front end 134 of the second pole piece layer and the ABS. In FIGS. 16A and 16B a hard mask 204 is formed on the second pole piece layer 130, the tops of the stud segments 300B and 302B and the alumina layer 140. The hard mask may be Mo, W, $Ta_2O_3$, $SiON_x$, $SiO_2$ or $Si_3N_4$ and is etchable by a fluorine based reactive ion etching (RIE). In FIGS. 17A and 17B a non-silicon adhesion/stop seed layer 206 is formed on the hard mask 204 followed by a photoresist layer 208 which is photopatterned to define a shape of the stud segments 300C and 302C and the second pole tip (PT) layer 132 (see FIG. 6) which includes the perpendicular recording pole tip 138.

The adhesion/stop seed layer 206 may be selected from the group consisting of Ta, W and Mo, such as Ta. In FIGS. 18A and 18B a fluorine based reactive ion etch is implemented into the adhesion/stop seed layer 206 and into the hard mask 204 for producing openings for the stud segments 300C and 302C and for the PT layer including the pole tip 138 as shown in FIGS. 6 and 7. Both of the adhesion/stop seed layer 206 and the hard mask 204 can be etched by the same fluorine based RIE step. As can be seen from FIGS. 18A and 18B openings for the stud segments 300C and 302C and for a trench are formed for the second pole tip layer. In FIGS. 19A and 19B a seed layer 210 (heavy line), such as NiFe, is sputter deposited into the trench openings for the stud segments 300C and 302C and the trench as well as on the front and rear pedestals. In FIGS. 20A and 20B plating is implemented to fill the openings for the stud segments 300C and 302C and the trench to a level slightly above the front and rear pedestals. In FIGS. 21A and 21B CMP is implemented until the CMP stops on the adhesion/stop seed layer 206.

In FIGS. 22A and 22B the layer of alumina is sputter deposited on the tops of the second pole tip layer 210 and the stud segments 300C and 302C. In FIGS. 23A and 23B photoresist is applied and patterned for the purpose of opening up the tops of the stud segments 300C and 302C. In FIGS. 24A and 24B a wet etch may be implemented through the alumina layer to open up the tops of the stud segments 300C and 302C. In FIGS. 25A and 25B the photoresist layer is removed and a bilayer photopatterned resist layer 310 is formed with openings to the tops of the stud segments 300C and 302C, as well as forming a pattern for the write shield 304. In FIGS. 26A and 26B ferromagnetic material is sputter deposited to form the top shield 304 and the stud segments 300D and 302D. In FIGS. 27A and 27B the bilayer photoresist is lifted off leaving the write shield 304 and the studs 300 and 302, as seen in FIG. 7, completed by the stud segments 300D and 302D. In FIGS. 28A and 28B an overcoat layer 312 is applied which is also shown in FIG. 7.

Discussion

It should be understood that vacuum deposition may be employed in lieu of the aforementioned frame plating step. Further, in a broad concept of the invention the pole tip layer can be employed without the aforementioned bottom second pole piece layer. The materials of the various layers are optional in some instances. For instance, photoresist may be employed in lieu of the alumina layers and vice versa. Further, while the magnetic head is planarized at various steps, planarization may occur only for the second pole piece and pole tip layers. Further, the magnetic head assembly may be a merged or piggyback head, as discussed hereinabove. The pole pieces are ferromagnetic materials which may be nickel iron. It should be noted that the second pole piece layer may be a different ferromagnetic material than the pole tip layer. For instance, the second pole piece layer may be $Ni_{45}Fe_{55}$ and the pole tip layer may be $Co_{90}Fe_{10}$.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A perpendicular recording write head, which has a head surface, comprising:

ferromagnetic first and second pole pieces;

a back gap which is recessed from the head surface;

the first and second pole pieces being connected at said back gap;
an insulation stack with a write coil layer embedded therein located between the first and second pole pieces and located between the head surface and said back gap;
the second pole piece having a pole tip which is located at the head surface;
a ferromagnetic write shield layer;
a nonmagnetic isolation layer located between the second pole piece and the write shield layer;
at least one ferromagnetic stud magnetically connecting the first pole piece layer and the write shield layer; and
said at least one ferromagnetic stud being located between the head surface and said insulation stack.

2. A perpendicular recording write head as claimed in claim 1 comprising:
the pole tip being laterally surrounded by a reactive ion etchable (RIEable) mask; and
an adhesion layer on the RIEable mask.

3. A perpendicular recording write head as claimed in claim 2 wherein the adhesion layer is selected from the group consisting of Ta, W and Mo.

4. A perpendicular recording write head as claimed in claim 3 wherein the RIEable mask is selected from the group consisting of Mo, W, $Ta_2O_3$, $SiON_X$, $SiO_2$ and $Si_3N_4$.

5. A perpendicular recording write head as claimed in claim 4 wherein the adhesion layer is Ta.

6. A perpendicular recording write head as claimed in claim 5 further comprising:
a second ferromagnetic stud located between the head surface and the insulation stack and magnetically connecting the first pole piece layer and the write shield layer; and
said at least one ferromagnetic stud and the second ferromagnetic stud being laterally spaced from one another with one on each side of the pole tip.

7. A perpendicular recording write head as claimed in claim 1 further comprising:
the second pole piece layer having first and second layers with the first layer being located between the insulation stack and the second layer;
the first layer being recessed from the head surface; and
the second layer having said pole tip at the head surface.

8. A perpendicular recording write head as claimed in claim 7 further comprising:
a second ferromagnetic stud located between the head surface and the insulation stack and magnetically connecting the first pole piece layer and the write shield layer; and
said at least one ferromagnetic stud and the second ferromagnetic stud being laterally spaced from one another with one on each side of the pole tip.

9. A perpendicular recording write head as claimed in claim 8 further comprising:
the pole tip being laterally surrounded by a reactive ion etchable (RIEable) mask; and
an adhesion layer on the RIEable mask.

10. A perpendicular recording write head as claimed in claim 9 wherein the RIEable mask is selected from the group consisting of Mo, W, $Ta_2O_3$, $SiON_X$, $SiO_2$ and $Si_3N_4$.

11. A perpendicular recording write head as claimed in claim 10 wherein the adhesion layer is Ta.

12. A magnetic head assembly that has a head surface, a read head and a perpendicular recording write head, comprising:
the read head including:
ferromagnetic first and second shield layers; and
a read sensor located between the first and second shield layers;
the perpendicular recording write head including:
ferromagnetic first and second pole pieces wherein the first pole piece layer is a common layer with the second shield layer;
a back gap which is recessed from the head surface;
the first and second pole pieces being connected at said back gap;
an insulation stack with a write coil layer embedded therein located between the first and second pole pieces and located between the head surface and said back gap;
the second pole piece having a pole tip which is located at the head surface;
a ferromagnetic write shield layer;
a nonmagnetic isolation layer located between the second pole piece and the write shield layer;
at least one ferromagnetic stud magnetically connecting the first pole piece layer and the write shield layer; and
said at least one ferromagnetic stud being located between the head surface and said insulation stack.

13. A magnetic head assembly as claimed in claim 12 further comprising:
the second pole piece layer having first and second layers with the first layer being located between the insulation stack and the second layer;
the first layer being recessed from the head surface; and
the second layer having said pole tip at the head surface.

14. A magnetic head assembly as claimed in claim 13 further comprising:
a second ferromagnetic stud located between the head surface and the insulation stack and magnetically connecting the first pole piece layer and the write shield layer; and
said at least one ferromagnetic stud and the second ferromagnetic stud being laterally spaced from one another with one on each side of the pole tip.

15. A magnetic head assembly as claimed in claim 14 further comprising:
a reactive ion etchable (RIEable) mask laterally surrounding the pole tip; and
an adhesion layer on the RIEable mask.

16. A magnetic head assembly as claimed in claim 15 wherein the adhesion layer is selected from the group consisting of Ta, W and Mo.

17. A magnetic head assembly as claimed in claim 16 wherein the RIEable mask is selected from the group consisting of Mo, W, $Ta_2O_3$, $SiON_X$, $SiO_2$ and $Si_3N_4$.

18. A magnetic head assembly as claimed in claim 17 wherein the adhesion layer is Ta.

* * * * *